US008225851B2

(12) United States Patent
Ohwaki et al.

(10) Patent No.: US 8,225,851 B2
(45) **Date of Patent: *Jul. 24, 2012**

(54) ALUMINUM ALLOY MATERIAL AND PLATE HEAT EXCHANGER WITH SUPERIOR CORROSION RESISTANCE

(75) Inventors: Takeshi Ohwaki, Kobe (JP); Wataru Urushihara, Kobe (JP); Junichiro Kinugasa, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/469,225

(22) Filed: May 20, 2009

(65) Prior Publication Data

US 2010/0006277 A1 Jan. 14, 2010

(30) Foreign Application Priority Data

Jul. 10, 2008 (JP) ................................ 2008-180498

(51) Int. Cl.
*F28F 19/02* (2006.01)
*F28F 19/00* (2006.01)

(52) U.S. Cl. .................................... 165/133; 165/134.1

(58) Field of Classification Search .................. 165/133, 165/134.1
See application file for complete search history.

(56) References Cited

U.S. PATENT DOCUMENTS

| | | | | |
|---|---|---|---|---|
| 4,330,446 | A * | 5/1982 | Miyosawa | 523/409 |
| 5,463,804 | A * | 11/1995 | McCleary et al. | 29/469.5 |
| 5,573,060 | A * | 11/1996 | Adderley et al. | 165/166 |
| 5,994,462 | A * | 11/1999 | Srinivasan et al. | 525/65 |
| 6,242,054 | B1 | 6/2001 | Baalmann et al. | |
| 6,338,876 | B1 | 1/2002 | Ishii et al. | |
| 2003/0035970 | A1 | 2/2003 | Wada et al. | |
| 2005/0197467 | A1 * | 9/2005 | Komiya et al. | 525/353 |
| 2008/0283228 | A1 * | 11/2008 | Ohwaki et al. | 165/151 |
| 2009/0081449 | A1 * | 3/2009 | Ohwaki et al. | 428/334 |

FOREIGN PATENT DOCUMENTS

| | | |
|---|---|---|
| CN | 101191229 A | 6/2008 |
| EP | 1 927 676 A2 | 6/2008 |
| JP | 2000-283695 | 10/2000 |
| JP | 2003-88748 | 3/2003 |
| JP | 2004-42482 | 2/2004 |
| JP | 2006-169561 | 6/2006 |

OTHER PUBLICATIONS

Zufang Zhu, "Technology Application Handbook of Anode Oxidation Process for Aluminium Alloys", Metallurgy Industry Press, ISBN 978-7-5024-4252-1, May 2007, 3 pages (with Partial English Translation).
U.S. Appl. No. 12/174,892, filed Jul. 17, 2008, Takeshi Ohwaki et al.
U.S. Appl. No. 11/852,721, filed Sep. 10, 2007, Takeshi Ohwaki et al.
Akihiro Oyabuki et al., "Self-repairing capability of anticorrosive coating for aluminum alloys", Proceedings of JSCE Materials and Environments, 2004, 16 pages (with English Translation).

* cited by examiner

*Primary Examiner* — Cheryl J Tyler
*Assistant Examiner* — Brandon M Rosati
(74) *Attorney, Agent, or Firm* — Oblon, Spivak, McClelland, Maier & Neustadt, L.L.P.

(57) ABSTRACT

Disclosed are an aluminum alloy material and a plate heat exchanger using the aluminum alloy material, both of which have superior corrosion resistance. Specifically, the aluminum alloy material includes an aluminum alloy base material having an anodic oxide layer with an average thickness of 1 to 20 μm as its surface layer, an organic phosphonic acid primer coating arranged on the surface of the aluminum alloy base material, and a fluorocarbon resin coating arranged on the surface of the organic phosphonic acid primer coating and having an average thickness of 1 to 100 μm after drying.

8 Claims, No Drawings

ALUMINUM ALLOY MATERIAL AND PLATE HEAT EXCHANGER WITH SUPERIOR CORROSION RESISTANCE

BACKGROUND OF THE INVENTION

1. Field of the Invention

The present invention relates to an aluminum alloy material with superior corrosion resistance, and to a plate heat exchanger using the aluminum alloy material in or as a heat transfer unit that uses a corrosive fluid, such as seawater, as a coolant (cooling medium).

2. Description of the Related Art

Aluminum (Al) alloys have high specific strength and high thermal conductivity and thus have been widely used as materials for compact lightweight heat exchangers. Representative examples of heat exchangers composed of aluminum alloys include fin-and-tube heat exchangers for use in household air conditioners and automotive radiators. In contrast, most of industrial single-pass heat exchangers using seawater as coolants are composed of titanium (Ti). Attempts have been made, however, to apply more economical aluminum alloys to such industrial single-pass heat exchangers.

Exemplary single-pass heat exchanges including heat transfer units using seawater as coolants (cooling water) include plate heat exchangers. They are exposed to stringent corrosive environments upon use in seawater environments. Thus, titanium (Ti), which has excellent corrosion resistance, is currently used. Aluminum alloys have high corrosion resistance as materials. However, when aluminum alloys are used for such plate heat exchangers in place of titanium, further sufficient corrosion protection is required, because they have not so high corrosion resistance as compared to titanium.

In general, examples of corrosion protection of aluminum alloys constituting such plate heat exchangers include formation of anodic oxide coatings, electrolytic protection, and formation of coatings with paint. Corrosion protection measures, if applied to heat exchangers, further include the incorporation of an inhibitor into a coolant.

However, plate heat exchangers are of a single-pass type, meaning that a coolant is discharged to outside of a system after passing through the apparatus and is not reused by circulation. Thus, a corrosion protection measure using an inhibitor is not proper, but a corrosion protection measure using paint film formation is economically appropriate.

Examples of coatings usable for aluminum alloys constituting heat exchangers include various types of inorganic, organic, and organic-inorganic hybrid coatings. These coatings are now practically used. Methods of forming coatings for heat exchangers are described typically in Japanese Unexamined Patent Application Publication (JP-A) No. 2003-88748 (Patent Document 1), JP-A No. 2004-42482 (Patent Document 2), JP-A No. 2006-169561 (Patent Document 3), and Akihiro YABUKI, Hiroyoshi YAMAGAMI, Takeshi OWAKI, Kiyomi ADACHI, and Koji NOISSHIKI, "Self-Repairing Property of Anticorrosive Coating for Aluminum Alloy", Conference Proceedings of Material and Environment, 3-4 (2004) (Non-patent Document 1).

Patent Document 1 discloses the formation of a polyaniline coating for an aluminum alloy not constituting a plate heat exchanger using seawater as a coolant, to which the present invention is directed, but constituting a fin-and-tube heat exchanger for use typically in household air conditioners and automotive radiators.

Patent Document 2 discloses that, to improve adhesion, a coating is formed on a composite primer coating for an aluminum alloy material constituting a fin-and-tube heat exchanger for use in household air conditioners and automotive radiators as in Patent Document 1, which composite primer coating includes a coating prepared through treatment with a boehmite and/or a silicate.

Non-patent Document 1 discloses an anticorrosive trifluoroethylene polymer coating for a single-pass heat exchanger, which coating has self-repairing properties.

Patent Document 3 proposes a self-repairing aluminum alloy anticorrosive coating further containing 0.1 to 10 percent by volume of one or more members selected from zinc, titanium, manganese, aluminum, and niobium, in addition to such trifluoroethylene polymer. This technique is indicated as an improvement of the trifluoroethylene polymer anticorrosive coating. This is a measure for the fact that with a heat exchanger using seawater as a coolant, the surface of the heat exchanger is liable to be damaged, and, when surface damage is once induced, the damage tends to be abruptly enlarged by a vigorous corrosive action with seawater. More specifically, it is stated that the trifluoroethylene polymer anticorrosive coating containing a powder of the above-mentioned metal exhibits self-repair capability when the coating suffers damage.

The polyaniline coating disclosed in Patent Document 1 may be sufficient for an improvement in corrosion resistance of fin-and-tube heat exchangers used for household air conditioners and automotive radiators. However, when used in plate heat exchangers using seawater as coolants, to which the present invention is directed, such a coating is unsatisfactory with respect to seawater corrosion resistant properties such as corrosion resistance and coating adhesion in a saline environment such as of seawater.

The anticorrosive trifluoroethylene polymer coatings (fluorocarbon resin coatings) disclosed in Patent Document 3 and Non-Patent Document 1 have superior seawater corrosion resistance compared to the polyaniline coating disclosed in Patent Document 1 and to common corrosion protection such as anodic oxidation coatings and other coatings. However, when applied to a plate heat exchanger using seawater as a coolant, to which the present invention is directed, there arises a problem in that they degrade in adhesion (adhesion durability) to aluminium alloy materials in long-term use and are not thus reliable.

The degradation of adhesion (i.e., coating durability) to aluminium alloy materials in long use occurs likewise in primer or primer treatment that is directed to heat exchangers used in domestic air conditioners and automotive radiators such as of Patent Document 2. However, the fin-and-tube heat exchangers used in the air conditioners and automotive radiators have the life of at most ten and several years, and a required life of corrosion resistance is such a relatively short time as just mentioned.

In this connection, however, plate heat exchangers using seawater as coolants, such as vaporizers for natural liquefied gas, are industrially employed in plants, are of large-scale equipment and thus expensive. Accordingly, it is required that the life and anticorrosive life of the heat exchangers be a semipermanent life of several tens of years.

The corrosion resistance of such long life-oriented plate heat exchangers using seawater as coolants is predominant of adhesion of a coating to an aluminium alloy material rather than the corrosion resistance of the coating itself.

In this regard, the anticorrosive technique of providing a trifluoride resin anticorrosive coating (fluorocarbon resin coating) directly on a surface of aluminium alloy material as in Patent Document 3 and Non-patent Document 1 has a practical problem in that an adhesion to the aluminium alloy material is poor, and it is difficult to substantially improve the corrosion resistance under use of seawater.

SUMMARY OF THE INVENTION

Under these circumstances, an object of the present invention is to provide an aluminium alloy material having superior adhesion of a trifluoride resin anticorrosive coating, i.e. an aluminium alloy material having superior corrosion resistance. Another object of the present invention is to provide a plate heat exchanger with superior corrosion resistance.

Specifically, according to an embodiment of the present invention, there is provided an aluminum alloy material with superior corrosion resistance, which includes an aluminum alloy base material (base metal or substrate), an organic phosphonic acid primer coating arranged on the surface of the aluminum alloy base material, and a fluorocarbon resin coating arranged on the surface of the organic phosphonic acid primer coating, in which the aluminum alloy base material has an anodic oxide layer as its surface layer, the anodic oxide layer has an average thickness of from 1 to 20 μm, and the fluorocarbon resin coating has an average thickness of from 1 to 100 μm after drying.

The fluorocarbon resin coating preferably contains a trifluoroethylene polymer as its base polymer.

The trifluoroethylene polymer is preferably a chlorotrifluoroethylene/vinyl ether copolymer, and the fluorocarbon resin coating is preferably a crosslinked product of the chlorotrifluoroethylene/vinyl ether copolymer with an isocyanate.

The fluorocarbon resin coating preferably contains substantially no metal powder.

The organic phosphonic acid primer coating may contain at least one organic phosphonic acid selected from methylphosphonic acid, ethylphosphonic acid, and vinylphosphonic acid.

The aluminum alloy material is preferably used in a plate heat exchanger that uses a corrosive fluid as a coolant.

According to another embodiment of the present invention, there is provided a plate heat exchanger with superior corrosion resistance, which includes the aluminum alloy material in or as a heat transfer unit that uses a corrosive fluid as a coolant.

According to the present invention, there can be provided an aluminum alloy material having superior adhesion of a fluorocarbon resin coating and thus preventing the coating from peeling off. There can also be provided a plate heat exchanger with superior corrosion resistance, using the aluminum alloy material in or as a heat transfer unit that uses seawater as a cooling water (coolant).

DESCRIPTION OF THE PREFERRED EMBODIMENTS

The present invention will be illustrated in detail with reference to some embodiments below. All numbers are herein assumed to be modified by the term "about."

Fluorocarbon Resin Coating

The thickness (average thickness) of the fluorocarbon resin coating is from 1 to 100 μm. A fluorocarbon resin coating, if having an average thickness of less than 1 μm, may show insufficient corrosion resistance. In contrast, a fluorocarbon resin coating, if having an average thickness of more than 100 μm, may impede the high thermal conductivity of aluminum to thereby impair the heat exchange capability of the heat exchanger and may show reduced adhesion, i.e., insufficient corrosion resistance contrarily. Accordingly, the average thickness of the fluorocarbon resin coating should be within the range of from 1 to 100 μm.

The average thickness of the fluorocarbon resin coating is determined in the following manner. A sample fluorocarbon resin coating is formed on an aluminum alloy base material through the interposition of an organic phosphonic acid primer coating mentioned below, and sufficiently dried. The cross sections of appropriate ten points of the sample coating are observed with an optical microscope at a magnification of about 50 times to measure thicknesses, and the ten measurements are averaged.

The fluorocarbon resin coating for use in the present invention preferably contains substantially no metal (metallic powder) such as zinc, titanium, manganese, aluminum, or niobium as described in Patent Document 3. A fluorocarbon resin coating, if containing any metal (metallic powder), may deteriorate in adhesion, because the metal will be oxidized to form an oxide in the coating.

Fluorocarbon Resins

Exemplary fluorocarbon resins for use in the fluorocarbon resin paint (coating) include trifluoroethylene polymers and tetrafluoroethylene polymers. Of these fluorocarbon resins, preferred are trifluoroethylene polymers because of higher adhesion to the organic phosphonic acid primer coating and higher corrosion resistance. The trifluoroethylene polymers are also preferred from the standpoint that they are soluble in low polar solvents having relatively low odor, and easy in handling (with good workability). The trifluoroethylene polymers and tetrafluoroethylene polymers may contain monomeric molecules and/or oligomeric molecules.

Trifluoroethylene, in which three of four hydrogen (H) atoms in an ethylene molecule are substituted by fluorine (F) atoms, is copolymerized with a copolymerizable compound (comonomer) such as a vinyl ether, an acrylic compound, and/or a vinyl ester, to form monomeric and oligomeric molecules of trifluoroethylene polymer. Tetrafluoroethylene, in which all four hydrogen (H) atoms in an ethylene molecule are substituted by fluorine (F) atoms, is copolymerized with a copolymerizable compound such as a vinyl ether, an acrylic compound, and/or a vinyl ester, to form monomeric and oligomeric molecules of tetrafluoroethylene polymer.

Exemplary trifluoroethylene polymers include chlorotrifluoroethylene (CTFE)/vinyl ether copolymers and chlorotrifluoroethylene/acrylic copolymers.

Fluorocarbon Resin Paint

A fluorocarbon resin paint for use in the present invention may be prepared by crosslinking these monomeric and/or oligomeric molecules of trifluoroethylene polymer with isocyanate groups (—N═C═O) of an isocyanate compound and/or siloxane groups of a siloxane compound serving as a curing agent.

In the present invention, a fluorocarbon resin paint prepared by crosslinking a chlorotrifluoroethylene/vinyl ether copolymer with a curing agent, such as an isocyanate or siloxane compound, is preferred because of the highest adhesion to the organic phosphonic acid primer coating.

The fluorocarbon resin paint as a coating composition is prepared by adding the curing agent, such as an isocyanate or siloxane compound, to the monomeric and oligomeric molecules of trifluoroethylene polymer as a base polymer. For example, 10 to 15 parts by mass of the base polymer is mixed with 0.1 to 3 parts by mass of the curing agent. The mixture is diluted with a thinner, according to necessity, to form the coating composition.

Organic Phosphonic Acid Primer Coating

In the present invention, the primer coating of an organic phosphonic acid, a kind of phosphorus-containing acid, for the fluorocarbon resin paint is selected as a primer coating (treatment), in order to improve the adhesion of the fluorocarbon resin coating (anticorrosive coating) to the aluminum alloy base material so as to improve corrosion resistance during use in seawater.

It should be noted that, in spite of being phosphorus-containing acids as with organic phosphonic acids, phosphoric acids, including inorganic phosphoric acids and organic phosphoric acids such as phosphates (e.g., zinc phosphate), as well as common primer treatments, such as chromate treatment and boehmite treatment, do not have the practical effect of improving adhesion of a fluorocarbon resin coating (anticorrosive coating) to the aluminum alloy base material. Thus, these are not employed herein.

Organic phosphonic acids are unsubstituted compounds each having two hydroxyl groups bonded to the phosphorus atom. Exemplary organic phosphonic acids include methylphosphonic acid: $CH_3P(=O)(OH)_2$, ethylphosphonic acid: $C_2H_5P(=O)(OH)_2$, vinylphosphonic acid: $C_2H_3P(=O)(OH)_2$, octylphosphonic acid: $C_8H_{17}P(=O)(OH)_2$, and phenylphosphonic acid: $C_6H_5P(=O)(OH)_2$.

From the viewpoint of handleability and superior adhesion-improving effect, the organic phosphonic acid primer coating is preferably composed of at least one organic phosphonic acid selected from methylphosphonic acid, ethylphosphonic acid, and vinylphosphonic acid.

Organic phosphonic acid has two hydroxyl (OH) groups, as described above. The two OH groups respectively bind to aluminum (Al) and oxygen (O) of the after-mentioned anodic oxide film ($Al_2O_3$) on the surface of the aluminum alloy base material. The bond is a covalent bond and is very strong compared with other bonds such as ionic bond, van der Waals bond, and hydrogen bond. The hydrocarbon component and C—O component of the fluorocarbon resin are covalently bonded to the organic component of the organic phosphonic acid during crosslinking with the curing agent, forming very strong bonds. The fluorocarbon resin coating applied is therefore strongly bonded to the anodic oxide layer of the aluminum alloy base material through the organic phosphonic acid primer coating, thus significantly improving coating adhesion.

The way to form the organic phosphonic acid primer coating is not particularly limited. In view that the uniformity of the primer coating affects coating adhesion, the organic phosphonic acid primer coating is preferably prepared by immersing the aluminum alloy base material in an aqueous solution of organic phosphonic acid rather than by other procedures such as directly applying such a coating solution to the surface of the aluminum alloy base material.

The thickness of the organic phosphonic acid primer coating is not particularly specified. It is difficult and unnecessary to form the organic phosphonic acid primer coating having a thickness of the order of micrometers by the process for forming a primer coating. By employing the known process for forming a primer coating, the primer coating has a thickness of at most several angstroms to several tens of angstroms, which thickness is sufficient to improve the adhesion.

Uniformity in the thickness of the primer coating is important rather than the thickness of the organic phosphonic acid primer coating. From this viewpoint, the organic phosphonic acid primer coating is preferably prepared by immersing the aluminum alloy base material in an aqueous solution of organic phosphonic acid. The immersion in the aqueous solution of organic phosphonic acid is more preferably performed under conditions described below: the concentration of the organic phosphonic acid is in the range of from 0.01 to 100 g/L, the temperature of the aqueous solution is in the range of from 50° C. to 100° C., and the immersion time (duration) is in the range of from 1 to 120 seconds.

In the case of an excessively low organic phosphonic acid concentration of less than 0.01 g/L, an excessively low temperature of the aqueous solution of lower than 50° C., and an excessively short immersion time of less than 1 second, the thickness of the primer coating may become nonuniform, thereby increasing the possibility of reduction in coating adhesion. In the case of an excessively high organic phosphonic acid concentration of more than 100 g/L, an excessively high temperature of the aqueous solution of higher than 100° C., and an excessively long immersion time of more than 120 seconds, the thickness of the primer coating may become nonuniform, thereby increasing the possibility of reduction in coating adhesion. Thus, the formation of the organic phosphonic acid primer coating is preferably performed by immersion of the aluminum alloy base material in the aqueous solution of organic phosphonic acid under the conditions described above.

Anodic Oxidation

The surface of the aluminum alloy base material is subjected to anodic oxidation in order to form the organic phosphonic acid primer coating and the fluorocarbon resin coating with further satisfactory adhesion. Before carrying out anodic oxidation, the aluminum alloy base material is subjected to ultrasonic cleaning so as to remove, for example, soil on the surface of the aluminum alloy base material.

In the anodic oxidation, the aluminum alloy base material serving as an anode is immersed in an electrolytic solution and electrolysis is conducted to form an anodic oxide layer as a surface layer of the base material, in which the anodic oxide layer has an average thickness of from 1 to 20 μm. Exemplary usable electrolytic solutions include sulfuric acid, oxalic acid, and a mixture of sulfuric acid and oxalic acid.

An anodic oxide layer, if having an average thickness of less than 1 μm, may not contribute to a sufficient improvement in adhesion durability of the coating, failing to provide a desired corrosion resistance. In contrast, an anodic oxide layer, if having an average thickness of more than 20 μm, may reduce the heat exchange capability of the heat exchanger to impair the practicability of the heat exchanger, although satisfactory adhesion durability is obtained. Thus, the average thickness of the anodic oxide layer should be within the range of 1 to 20 μm.

The thickness of the anodic oxide layer can be adjusted by controlling the current, voltage, and duration of the anodic oxidation. Among these parameters, the control of the anodic oxidation duration is effective to adjust the thickness of the anodic oxide layer. Typically, an anodic oxidation for 15 minutes is enough to give an anodic oxide layer having an average thickness of 5 μm. Likewise, an anodic oxidation for 50 minutes is enough to give an anodic oxide layer having an average thickness of 20 μm.

The average thickness of the anodic oxide layer is determined in the following manner. A sample anodic oxide layer is formed on the aluminum alloy base material, and the cross sections of appropriate ten points of the sample anodic oxide layer is observed with a scanning electron microscope to measure thicknesses, and the ten measurements are averaged.

Aluminum Alloy Base Material

Aluminum alloys that can be easily processed or formed into plates may be used. Exemplary types of aluminum alloys usable herein include 1000, 3000, 5000, 6000, and 7000 series aluminum alloys specified in Japanese Industrial Standards (JIS) and Aluminum Association (AA) standards. Plates, strips, and extruded moldings of these aluminum alloys may be appropriately used. Specifically, 3003 and 5052 series aluminum alloys may be suitably used.

Other Applications

The present invention has been described with reference to embodiments where the invention is applied to a heat exchanger that uses seawater as a coolant. It should be noted, however, that the present invention can also be applied to any other heat exchangers that use corrosive fluids as coolants. Exemplary corrosive fluids include industrial water containing large amounts of calcium ion and/or magnesium ion; and groundwater containing, for example, hydrogen carbonate ion, chlorine ion, sulfur ion, iron ion, sodium ion, metasilicic acid, and/or hydrogen sulfide.

EXAMPLES

The present invention will be illustrated in further detail with reference to several examples below. It should be noted, however, that these examples are not intended to limit the scope of the present invention, various alternations and modifications may be made without departing from the scope and spirit of the present invention, and they are included within the technical scope of the present invention.

In each of Examples according to the present invention, the surface of an aluminum alloy sheet 1.0 mm thick, 60 mm wide, and 60 mm long as a test piece was subjected to anodic oxidation to form an anodic oxide layer on the surface of the test piece. Next, an organic phosphonic acid primer coating was formed on the surface of the anodic oxide layer; and a fluorocarbon resin coating made of a trifluoroethylene polymer was formed on the surface of the organic phosphonic acid primer coating to give a coated aluminum alloy material. The coating adhesion, i.e., the corrosion resistance, of the coated aluminum alloy material was evaluated. The results are shown in Table 1.

Independently, a coated aluminum alloy material having no anodic oxide layer, and a coated aluminum alloy material having an anodic oxide layer but having no organic phosphonic acid primer coating were prepared as Comparative Examples, and their coating adhesion, i.e., corrosion resistance, was evaluated. In these Comparative Examples, an aluminum alloy sheet 1.0 mm thick, 60 mm wide, and 60 mm long as with Examples was used in the test piece. The results are shown in Table 2.

Pretreatment

For the pretreatment, soil, oxides, and hydroxides formed on the surface of the aluminium alloy sheet test piece were once removed to expose the aluminium metal surface. Specifically, while immersing the test piece in acetone, ultrasonic cleaning for 30 seconds was carried out.

Anodic Oxidation

Anodic oxidation was conducted by immersing the test piece after the pretreatment in an electrolytic solution and carrying out electrolysis to form an anodic oxide layer having an average thickness of 5 μm or 20 μm on the surface of the test piece. The anodic oxidation was conducted with a diluted sulfuric acid having a concentration of 15 to 18 percent by mass as the electrolytic solution, at a current of from 80 to 100 $A/m^2$ and a voltage of from 10 to 13 V for a duration of from 15 to 20 minutes. The thickness of the anodic oxide layer was controlled by adjusting the treatment duration. Specifically, an anodic oxide layer 5 μm thick was obtained by anodic oxidation for 15 minutes, and an anodic oxide layer 20 μm thick was obtained by anodic oxidation for 50 minutes. Next, a sealing additive mainly containing nickel acetate was added, and boiling-water sealing was conducted for 15 minutes.

Primer Treatment with Organic Phosphonic Acid

Vinylphosphonic acid, used as an organic phosphonic acid, was diluted with ion exchanged water to a concentration of 10 g/liter to provide an aqueous solution of organic phosphonic acid primer. Next, the aluminium alloy sheet test piece after the anodic oxidation was immersed in the aqueous solution of organic phosphonic acid primer, heated at 65° C., for 10 seconds or for 2 minutes (120 seconds) to form an organic phosphonic acid primer coating, followed by rinsing with ion exchanged water.

Fluorocarbon Resin Coating

A paint for constituting a fluorocarbon resin coating used herein was one prepared by crosslinking a chlorotrifluoroethylene/acrylic copolymer (base polymer) with an isocyanate curing agent. In the paint, 13 parts by mass of the base polymer was mixed with 1 part by mass of the curing agent. The paint was then diluted with a thinner at a suitable dilution ratio to give a coating composition. The aluminum alloy sheet test piece was immersed in the coating composition so as to maximize the uniformity of a coating, and the applied coating composition on the outermost surface of the test piece was dried to give a fluorocarbon resin coating having an average thickness of 5 μm.

High Temperature Corrosion Test

Initially, an artificial seawater ("Aquamarine" for metal corrosion test; supplied by Yashima Pure Chemicals, Co., Ltd.) was diluted 20-folds, and 0.13 N aqueous sodium hydroxide solution was added to adjust the artificial seawater to have a pH of 8.2, to give a test fluid. Independently, each of the test pieces according to Examples and Comparative Examples was fixed to a plastic sample holder. Specifically, the sample holder grasped edges of the test piece to allow the test piece to stand. The test piece held by the sample holder was placed in an autoclave, the test fluid was fed into the autoclave, and the autoclave was hermetically sealed.

The temperature was raised to a predetermined temperature and held for two weeks. In this procedure, the pressure was not controlled and allowed to be a vapor pressure. Two weeks later, the temperature was returned to normal atmospheric temperature (room temperature), and the sample holder was taken out from the autoclave, from which the test piece was recovered.

Evaluation

The corrosion resistance of the coating was evaluated by determining the adhesion of the coating after the high temperature corrosion test (accelerated corrosion test). Specifically, the test piece recovered from the test fluid was dried at 50° C. for 24 hours, and subjected to a cross-cut adhesion test.

These results demonstrate that the anodic oxidation of the surface of an aluminum alloy base material and the formation of an organic phosphonic acid primer coating enable the formation of a fluorocarbon resin coating with satisfactory adhesion to thereby significantly improve the corrosion resistance of the coating.

TABLE 1

| | | Aluminum alloy | | Treatment with organic phosphonic acid | | | | | |
|---|---|---|---|---|---|---|---|---|---|
| Category | Number | Type | Anodic oxide layer (μm) | Agent | Concentration (g/l) | Immersion temperature (° C.) | Immersion period (second) | Average thickness of coating (μm) | Result* (2 weeks later) |
| Examples | 1 | 3003 | 5 | vinylphosphonic acid | 10 | 65 | 10 | 5 | 100/100 |
| | 2 | 3003 | 5 | vinylphosphonic acid | 10 | 65 | 120 | 5 | 100/100 |
| | 3 | 3003 | 20 | vinylphosphonic acid | 10 | 65 | 10 | 5 | 100/100 |
| | 4 | 3003 | 20 | vinylphosphonic acid | 10 | 65 | 120 | 5 | 100/100 |

*Result: The result of the test piece upon tape peeling in the cross-cut adhesion test after holding the test piece at high temperatures. The result is indicated as a residual rate of cross cuts, i.e., how many cross cuts out of hundred cross cuts remain unpeeled.

TABLE 2

| | | Aluminum alloy | | Treatment with organic phosphonic acid | | | | | |
|---|---|---|---|---|---|---|---|---|---|
| Category | Number | Type | Anodic oxide layer (μm) | Agent | Concentration (g/l) | Immersion temperature (° C.) | Immersion period (second) | Average thickness of coating (μm) | Result* (2 weeks later) |
| Comparative Examples | 1 | 3003 | none | vinylphosphonic acid | 10 | 65 | 10 | 5 | 12/100 |
| | 2 | 3003 | none | vinylphosphonic acid | 10 | 65 | 120 | 5 | 28/100 |
| | 3 | 3003 | 5 | none | none | none | none | 5 | 0/100 |
| | 4 | 3003 | 20 | none | none | none | none | 5 | 0/100 |

*Result: The result of the test piece upon tape peeling in the cross-cut adhesion test after holding the test pieces at high temperatures. The result is indicated as a residual rate of cross cuts, i.e., how many cross cuts out of hundred cross cuts remain unpeeled.

In the cross-cut adhesion test, one hundred 1-mm square cross cuts were formed on the coating of the test piece, and a tape was attached thereto and then peeled therefrom according to the method specified in JIS K 5600-5-6.

Table 1 shows the results of Examples 1 to 4 according to the present invention. In Examples 1 to 4 in Table 1, the test pieces had different thicknesses of the anodic oxide layer and had different thicknesses of the organic phosphonic acid primer coating, but none of their coatings was peeled off upon tape peeling in the cross-cut adhesion tests.

In contrast, Table 2 shows the results of Comparative Examples 1 to 4. In Comparative Examples 1 and 2, no anodic oxide layer was formed. In Comparative Examples 3 and 4, an anodic oxide layer was formed but no organic phosphonic acid primer coating was formed. The test pieces according to Comparative Examples 1 and 2, having no anodic oxide layer, showed coating residual rates of 12/100 (12 cross cuts out of 100 cross cuts remained unpeeled) and 28/100 (28 cross cuts out of 100 cross cuts remained unpeeled), respectively, upon tape peeling in the cross-cut adhesion tests. In the test pieces according to Comparative Examples 3 and 4, having no organic phosphonic acid primer coating, all hundred cross cuts of the coating were peeled off (i.e., no cross cut remained unpeeled; 0/100) upon tape peeling.

What is claimed is:

1. An aluminum alloy material with superior corrosion resistance, comprising:

an aluminum alloy base material having an anodic oxide layer as its surface layer, the anodic oxide layer having an average thickness of from 1 to 20 μm;

an organic phosphonic acid primer coating being arranged on the surface of the aluminum alloy base material; and a fluorocarbon resin coating being arranged on the surface of the organic phosphonic acid primer coating and having an average thickness of from 1 to 100 μm after drying, wherein the organic phosphonic acid primer coating and the fluorocarbon resin coating are discrete layers.

2. The aluminum alloy material according to claim 1, wherein the fluorocarbon resin coating comprises a trifluoroethylene polymer as a base polymer.

3. The aluminum alloy material according to claim 2, wherein the trifluoroethylene polymer is a chlorotrifluoroethylene/vinyl ether copolymer, and wherein the fluorocarbon resin paint is a crosslinked product of the chlorotrifluoroethylene/vinyl ether copolymer with an isocyanate.

4. The aluminum alloy material according to claim 3, wherein the fluorocarbon resin coating contains substantially no metal powder.

5. The aluminum alloy material according to claim 1, wherein the organic phosphonic acid primer coating comprises at least one organic phosphonic acid selected from the group consisting of methylphosphonic acid, ethylphosphonic acid, and vinylphosphonic acid.

6. The aluminum alloy material according to claim 4, wherein the organic phosphonic acid primer coating comprises at least one organic phosphonic acid selected from the group consisting of methylphosphonic acid, ethylphosphonic acid, and vinylphosphonic acid.

7. The aluminum alloy material according to any one of claims 1 to 6, for use in a plate heat exchanger that uses a corrosive fluid as a coolant.

8. A plate heat exchanger with superior corrosion resistance, comprising the aluminum alloy material of any one of claims 1 to 6 in or as a heat transfer unit that uses a corrosive fluid as a coolant.

* * * * *